(12) United States Patent
Weinelt

(10) Patent No.: US 12,583,543 B2
(45) Date of Patent: Mar. 24, 2026

(54) MOTORCYCLE HAVING AN ADJUSTABLE AIR-GUIDING ELEMENT

(71) Applicant: Bayerische Motoren Werke Aktiengesellschaft, Munich (DE)

(72) Inventor: Jochen Weinelt, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 351 days.

(21) Appl. No.: 18/022,012

(22) PCT Filed: Aug. 5, 2021

(86) PCT No.: PCT/EP2021/071909
§ 371 (c)(1),
(2) Date: Feb. 17, 2023

(87) PCT Pub. No.: WO2022/063471
PCT Pub. Date: Mar. 31, 2022

(65) Prior Publication Data
US 2023/0348006 A1 Nov. 2, 2023

(30) Foreign Application Priority Data

Sep. 25, 2020 (DE) .................... 10 2020 125 060.6

(51) Int. Cl.
*B62J 17/10* (2020.01)
*B62J 17/02* (2006.01)
(Continued)

(52) U.S. Cl.
CPC ............... *B62J 17/10* (2020.02); *B62J 17/02* (2013.01); *B62J 17/06* (2013.01); *B62K 11/04* (2013.01)

(58) Field of Classification Search
CPC ... B62J 17/00; B62J 17/10; B62J 17/06; B62J 17/065; B62J 17/04; B62J 17/02;
(Continued)

(56) References Cited

U.S. PATENT DOCUMENTS 4,536,005 A * 8/1985 Tanaka ..................... B62J 17/10
16/334
4,925,231 A * 5/1990 Hamaguchi .............. B62J 17/10
49/386
(Continued)

FOREIGN PATENT DOCUMENTS

CN 203078663 U 7/2013
CN 111483527 A * 8/2020
(Continued)

OTHER PUBLICATIONS

Hack et al. (DE 102006020670 A1), machine translation (Year: 2007).*
(Continued)

*Primary Examiner* — Amy R Weisberg
*Assistant Examiner* — Wenwei Zhuo
(74) *Attorney, Agent, or Firm* — Crowell & Moring LLP

(57) ABSTRACT

A motorcycle having an adjustable air-guiding element, the air-guiding element having a root portion which is connected to a body and/or to a vehicle structure of the motorcycle, and an air-guiding portion which extends from the root portion as far as a free end of the air-guiding element. The air-guiding portion is movable between a deployed position and an inclined position relative to the body and/or to the vehicle structure and is supported on the body and/or on the vehicle structure by a spring-elastic support element.

17 Claims, 2 Drawing Sheets

(51) Int. Cl.
    *B62J 17/06*          (2006.01)
    *B62K 11/04*          (2006.01)

(58) Field of Classification Search
    CPC .... B62D 35/00; B62D 35/001; B62D 35/002;
                  B62D 35/005; B62D 35/007; B62D
                                        35/008
    USPC ................. 296/180.5, 78.1, 91, 96.11, 181.5
    See application file for complete search history.

(56)              References Cited

U.S. PATENT DOCUMENTS

| | | | |
|---|---|---|---|
| 5,730,483 | A | 3/1998 | Greger |
| 5,911,466 | A | 6/1999 | Hoshi et al. |
| 7,281,750 | B1 | 10/2007 | Wise |
| 9,415,664 | B2 | 8/2016 | Hoshi et al. |
| 2004/0080175 | A1 | 4/2004 | Wegener et al. |
| 2005/0121946 | A1 * | 6/2005 | McKnight ............... B64C 23/00 |
| | | | 296/180.1 |
| 2010/0301627 | A1 * | 12/2010 | Kern ........................ B62J 17/02 |
| | | | 296/78.1 |
| 2011/0233956 | A1 * | 9/2011 | Okubo .................... B62J 17/10 |
| | | | 296/78.1 |

FOREIGN PATENT DOCUMENTS

| | | | | |
|---|---|---|---|---|
| DE | 86 07 843 | U1 | 6/1986 | |
| DE | 19746440 | A1 * | 4/1999 | .............. B62J 17/02 |
| DE | 20001695 | U1 * | 5/2000 | ........... B62D 35/007 |
| DE | 102006020670 | A1 * | 11/2007 | .............. B62J 17/06 |
| DE | 197 07 282 | B4 | 3/2009 | |
| DE | 100 65 131 | B4 | 4/2009 | |
| DE | 10 2019 105 755 | A1 | 9/2020 | |
| EP | 0 685 385 | B1 | 9/1998 | |
| IT | 202200017802 | A1 * | 3/2024 | |
| JP | 59-26090 | U | 2/1984 | |
| JP | 2011-31705 | A | 2/2011 | |
| WO | WO-2006073244 | A1 * | 7/2006 | .............. B62J 17/00 |

OTHER PUBLICATIONS

Mason (DE 20001695 U1), machine translation (Year: 2000).*
Rehschuh (DE 19746440 A1), machine translation (Year: 1999).*
International Search Report (PCT/ISA/210) issued in PCT Application No. PCT/EP2021/071909 dated Nov. 4, 2021 with English translation (seven (7) pages).
German-language Written Opinion (PCT/ISA/237) issued in PCT Application No. PCT/EP2021/071909 dated Nov. 4, 2021 (seven (7) pages).
German-language Search Report issued in German Application No. 10 2020 125 060.6 dated May 4, 2021 with partial English translation (11 pages).
English translation of Chinese-language Office Action issued in Chinese Application No. 202180058333.8 dated Feb. 26, 2025 (6 pages).

* cited by examiner

MOTORCYCLE HAVING AN ADJUSTABLE AIR-GUIDING ELEMENT

CROSS REFERENCE TO RELATED APPLICATION

This application claims priority under 35 U.S.C. § 119 from German Patent Application No. 102020125060.6, filed Sep. 25, 2020, the entire disclosure of which is herein expressly incorporated by reference.

BACKGROUND AND SUMMARY OF THE INVENTION

The invention relates to a motorcycle with an adjustable air-guiding element in accordance with the preamble of patent claim 1.

Motorcycles, such as motorbikes, are known which, in addition to a vehicle body, have further air-guiding elements, in order to influence the flow around the vehicle and, in this way, to provide, for example, wind and weather protection for the rider and/or a pillion passenger.

For instance, EP 0 685 385 B1 has disclosed an electrically or hydraulically adjustable windshield which can be moved in the vertical direction between an upper and lower position, in order to divert an air stream according to requirements. A rider can correspondingly be protected to a different extent against the air stream, wet conditions and whirled-up dirt.

Furthermore, mechanically, electrically or hydraulically adjustable vehicle body parts are known which can be moved by the rider into a desired position in the case of a corresponding requirement and riding state. Apparatuses of this type are complicated, however, and always require active actuation by way of the rider and an actuating electronic and/or mechanical system. An actuation while riding is therefore usually not (readily) possible.

It is an object of the invention to provide an adjustable air-guiding element for a motorcycle, which air-guiding element can be produced simply and inexpensively and, moreover, requires as low an actuating effort as possible for the user (also synonymously called the "vehicle user" in the following text).

This object is achieved by way of a motorcycle in accordance with the subject matter of patent claim 1. Advantageous embodiments result from the dependent claims.

Accordingly, a motorcycle with an adjustable air-guiding element is provided, the air-guiding element having a root portion, which is connected to a vehicle body and/or a vehicle structure of the motorcycle, and an air-guiding portion which extends from the root portion as far as a free end of the air-guiding element. Moreover, the air-guiding portion can be moved relative to the vehicle body and/or the vehicle structure between a deployed position and a retracted position, and is supported by means of a resilient supporting element on the vehicle body and/or the vehicle structure.

A motorcycle in the context of the invention is understood to mean, in particular, motorbikes or motorscooters or scooters, including two-wheeled, three-wheeled or four-wheeled motorscooters, and, moreover, trikes, quads and the like.

The air-guiding element is arranged, for example, on an outer region of the motorcycle, preferably on a vehicle side or in a front region, and is fastened on the vehicle side by way of the root portion. The fastening provides a connection to the vehicle body of the motorcycle and/or to the vehicle structure of the motorcycle. It goes without saying that the motorcycle can comprise more than one adjustable air-guiding element of corresponding configuration.

The air-guiding element extends from the root portion as far as a free end. The free end can be formed, for example, by a remote end of the air-guiding element which faces away from the motorcycle.

In addition, at least the air-guiding portion of the air-guiding element is of relatively movable configuration, and can correspondingly be moved relative to the remaining vehicle between the deployed position and the retracted position. In the deployed position, in particular, a spacing of the free end from the remaining vehicle is greater than its spacing in the retracted position. In the retracted position, the air-guiding portion can be arranged, for example, close to an outer surface of the vehicle body, or can be integrated into this outer surface (preferably in a flush manner). It goes without saying that the movement between the deployed position and the retracted position can take place in both directions; in addition, any desired number of intermediate positions can optionally be provided. The movement can preferably take place in an infinitely variable manner, but as an alternative also in defined steps and intermediate steps in order to set the respective positions.

Within the context of the relative movement of the air-guiding portion, the resilient supporting element can be changed in terms of its shape, that is to say can be deformed, in order to provide support on the vehicle body and/or the vehicle structure in all positions and the possible intermediate positions. To this end, the resilient supporting element can load the air-guiding portion with a restoring force, in order to consistently move it out of the retracted position into the deployed position.

In this way, in the case of a corresponding embodiment of the supporting element, the air-guiding portion can be moved solely by way of this restoring force automatically out of the retracted position into the deployed position, without an active actuation by way of the vehicle user being necessary.

This provides the possibility that the air-guiding portion is moved passively and in a purely speed-controlled manner, since lower loading with an air stream takes place at a low speed and, as a result, the supporting element is situated in the deployed position. If a wind pressure rises as a result of an air stream which rises as a vehicle speed increases, the wind pressure acts counter to the restoring force. If the wind pressure exceeds the restoring force, the air-guiding portion is retracted to an increasing extent and is moved in the direction of the retracted position relative to the remaining vehicle.

As the retraction of the air-guiding portion increases, aerodynamic flow influencing is reduced, with the result that flow influencing which is as low as possible takes place in the retracted position. In contrast, the air-guiding portion is situated in the deployed position at the lower vehicle speed and provides aerodynamic flow influencing. Depending on the arrangement of the air-guiding element, this can be used, for example, to protect the user of the motorcycle, inter alia, against the air stream or whirled-up dirt and wet conditions.

For example, the connection of the root portion to the vehicle body and/or the vehicle structure can be configured as a rigid connection or as an articulated connection. In the case of a rigid connection, the root portion forms a locating bearing which is of immovable configuration. In this case, the relative movement of the air-guiding portion can be provided by way of an elastic deformation of the air-guiding portion. To this end, the air-guiding portion is of elastically deformable configuration along its entire length between the root portion and the free end, or merely in one portion or a plurality of portions.

The deformability can be adapted in such a way that it can be achieved by way of aerodynamic forces which typically occur during operation of the motorcycle, that is to say, in particular, as a result of the wind pressure of the air stream.

In accordance with the alternative embodiment of the above-described articulated connection, the root portion can have a joint which is connected on one side to the air-guiding portion and on the other side to the vehicle. The joint can be configured, for example, as an axial joint, such as a hinge, or else as a ball joint. In the context of this invention, what is known as an integral hinge should also be considered to be an articulated connection. In the case of the articulated connection, the air-guiding portion can be of stiff or rigid configuration. As an alternative however, it can also likewise be of elastically deformable configuration along its entire length between the root portion and the free end, or merely on one portion or a plurality of portions.

The root portion can preferably be arranged in front of the air-guiding portion in the vehicle longitudinal direction in each of the above-described embodiments. In this way, it can be ensured that an increasing air stream brings about increasing wind pressure loading of the air-guiding portion and a correspondingly increasing retraction onto the motorcycle.

The air-guiding element can preferably be configured in the deployed position for the reduction of air stream impact on a vehicle user. To this end, in each case at least one air-guiding element can be arranged in front of the user in the longitudinal direction on the respective vehicle side of the motorcycle.

In particular, the respective air-guiding element can be arranged in a region in front of the foot, the shin, the knee, the thigh and/or the hip of the user, in order to protect the respective body part completely or at least partially in the deployed position.

For example, the air-guiding element can be arranged in the vehicle longitudinal direction between a front wheel and a leg portion of the user.

To this end, in particular, an arrangement of the air-guiding element in the region of a vehicle radiator is possible.

In accordance with one embodiment, the supporting element can be connected to an inner side of the air-guiding portion. For example, the supporting element is arranged between the inner side of the air-guiding portion and an outer surface, facing the inner side, of the vehicle body or a vehicle structure which faces the inner side, and is connected in each case to these components.

For example, the supporting element can comprise a spring element for providing a restoring force, in order to move the air-guiding portion out of the retracted position into the deployed position.

If the spring element is configured as a compression spring, the air-guiding element or its air-guiding portion can be pressed into the deployed position and therefore away from the vehicle.

In every case, a restoring force of the resilient supporting element, in particular a spring force of the spring element, can be designed in such a way that, in the case of an increase in the speed, the wind pressure which is increased on this way on the deployed air-guiding element exceeds the restoring force, and the air-guiding portion is therefore moved into the retracted position.

For instance, the air-guiding element can be adapted in such a way that the air-guiding portion is situated in the retracted position at least from a defined (first) vehicle speed. This speed can be selected, for example, from a range between 120 and 180 km/h, preferably between 120 and 160 km/h. This means that the air-guiding portion is arranged in the retracted position at least from this speed value which is selected from the abovementioned ranges, as a result of which a drag coefficient (C×A) is low.

If the speed of the motorcycle is reduced, the retracted air-guiding portion is pressed into the deployed position again on account of the restoring force of the resilient supporting element.

The air-guiding element can thus be adapted in such a way that the air-guiding portion is situated in the deployed position at least up to a defined (second) vehicle speed. This can be selected, for example, from a range between 30 and 120 km/h, preferably between 50 and 120 km/h. This means that the air-guiding portion is arranged in the deployed position, in order to protect the user correspondingly, at least up to this speed value which is selected from the above-mentioned ranges.

It goes without saying that the two vehicle speeds are selected in each case in such a way that the defined (first) vehicle speed, from which the air-guiding portion is arranged in the retracted position, is greater than the defined (second) vehicle speed, up to which the air-guiding portion is arranged or remains in the deployed position.

The described air-guiding element therefore provides the possibility of adapting the speed to the road conditions and therefore of throttling it, for example in the case of riding in rain. The user is protected by way of the correspondingly deployed air-guiding portion. If, in contrast, the road conditions make a higher riding speed possible in dry weather, the air-guiding portion is moved into the retracted position by way of the correspondingly increased wind pressure of the air stream, in order to improve the aerodynamic and riding-dynamics properties of the motorcycle.

In the following text, the invention will be explained in greater detail on the basis of one exemplary embodiment with reference to the drawings.

DETAILED DESCRIPTION

Figure 1:
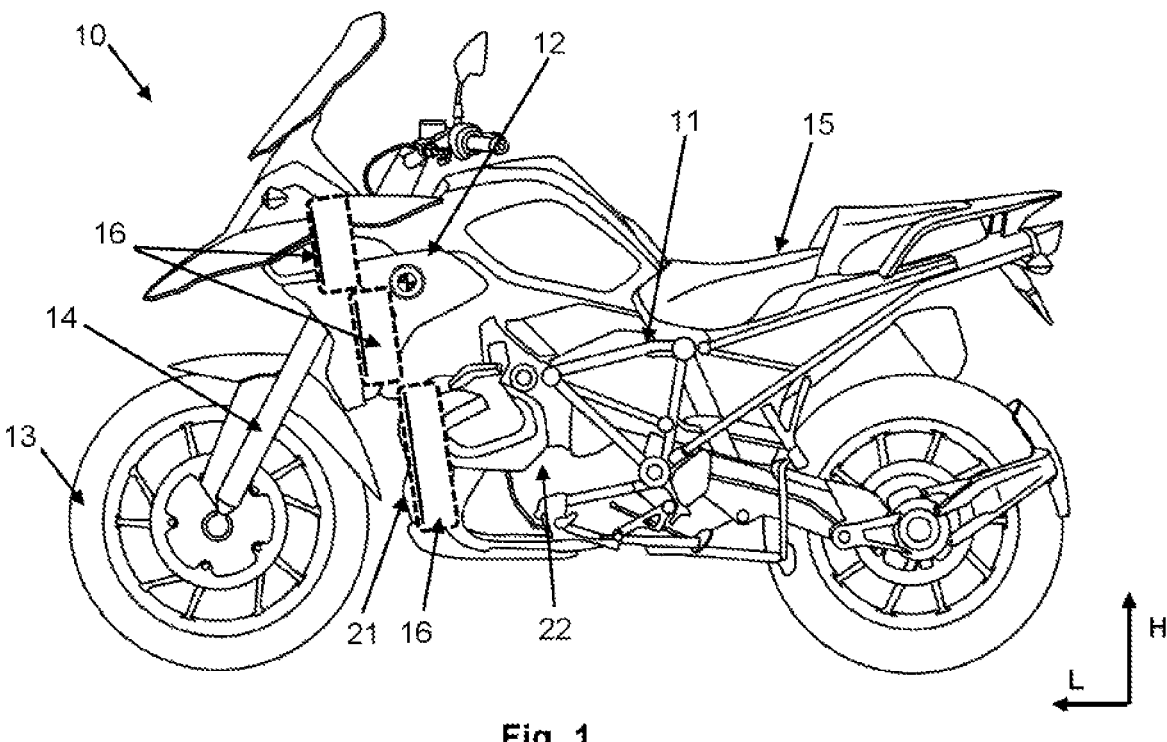
FIG. 1 shows a side view of the motorcycle in accordance with an embodiment of the present invention.

FIG. 1 shows a side view of a merely diagrammatically shown motorcycle 10 which is configured by way of example as a motorbike. The motorbike 10 comprises a vehicle structure 11 which comprises, inter alia, a vehicle frame and a vehicle body 12 which covers the vehicle structure 11 partially.

Three air-guiding elements 16 are provided by way of example on the vehicle body 12 on the vehicle side (left-hand vehicle side) which is visible in FIG. 1 between a front wheel 13 or its front wheel suspension system 14 and a seat region 15 of a user in the vehicle longitudinal direction L. It goes without saying that, instead of the three air-guiding elements 16, merely a single air-guiding element 16, or two or more than three air-guiding elements 16 can be provided.

Moreover, corresponding air-guiding elements can likewise be provided on the vehicle side (right-hand vehicle side) which faces away and is not visible.

Figure 2:
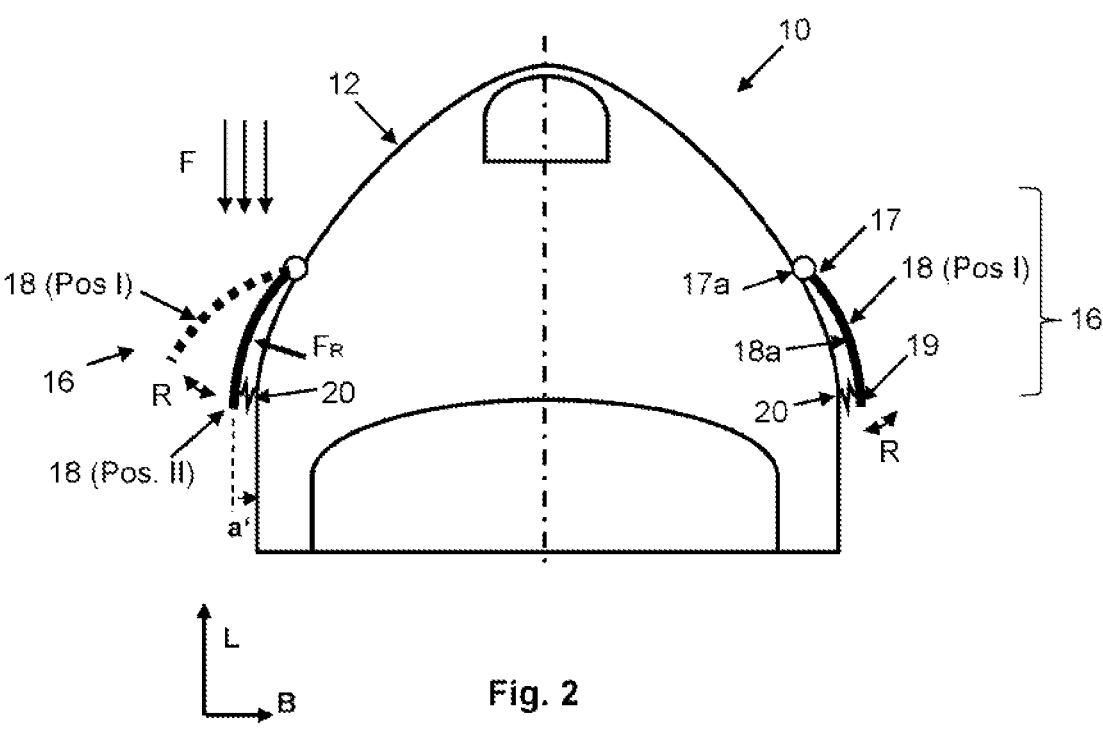
FIG. 2 shows a plan view of the motorcycle according to FIG. 1 with air-guiding portions in a retracted position.
Figure 3:
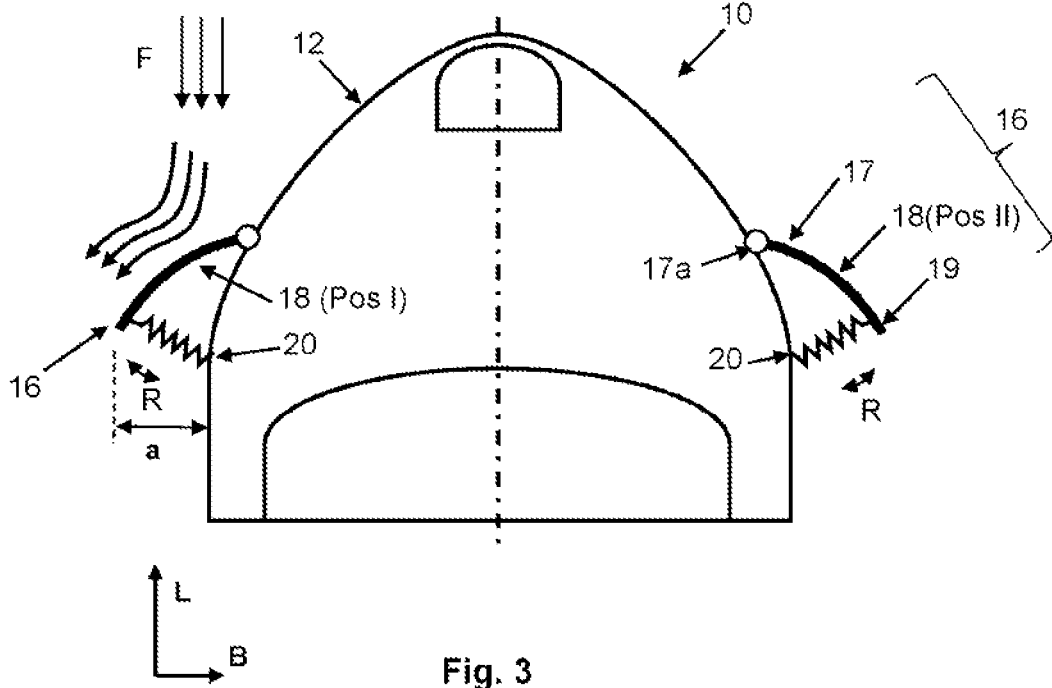
FIG. 3 shows a plan view of the motorcycle according to FIG. 1 with air-guiding portions in a deployed position.

The following FIGS. 2 and 3 show merely one air-guiding elements 16 per vehicle side for the sake of clarity. It goes that saying, however, that more than the one air-guiding element 16 can also be provided there.

Each of the air-guiding elements 16 which are shown there is configured as an adjustable air-guiding element 16, and comprises in each case one root portion 17, which is connected to the vehicle body 12 of the motorcycle 10, and one air-guiding portion 18 which extends from the root portion 17 as far as a free end 19 of the air-guiding element 16. Moreover, the air-guiding portion 18 of the respective air-guiding elements 16 can be moved (movement arrow R) relative to the vehicle body 12 or the vehicle structure 11 between a deployed position I (shown in FIG. 3) and a retracted position II (shown in FIG. 2), and is supported on the vehicle body 12 by means of a resilient supporting element 20. As an alternative or in addition, a support can be provided on the vehicle structure 11.

On account of the relative movability R, each air-guiding portion 18 can be moved correspondingly between the deployed position I and the retracted position II relative to the remaining vehicle 10, a spacing a of the free end 19 from the remaining vehicle 10 being greater in the deployed position I than a spacing a' in the retracted position II. As a consequence, the air-guiding portion 18 is arranged close to an outer surface of the vehicle body 12 in the retracted position II.

One embodiment is an alternative and therefore not shown, in the case of which embodiment the air-guiding portion 18 is integrated (preferably in a flush manner) into the outer surface of the vehicle body 12.

As can be seen from FIG. 2, the associated resilient supporting element 20 is deformed within the context of the relative movement R of the respective air-guiding portion 18, with the result that support on the vehicle body 12 is achieved in all positions and intermediate positions. To this end, the respective resilient supporting element 20 loads the respective air-guiding portion 18 with a restoring force FR, in order to move it in this way automatically out of the retracted position II according to FIG. 2 into the deployed position I according to FIG. 3.

According to FIGS. 2 and 3, the respective supporting element 20 is connected to an inner side 18a of the air-guiding portion 18, by the supporting element 20 being arranged and connected between the inner side 18a of the air-guiding portion 18 and an outer surface, facing the inner side 18a, of the vehicle body 12. The supporting element 20 is shown by way of example as a spring element which is configured as a compression spring, in order to provide the restoring force FR.

The restoring force FR is preferably designed in such a way that, in the case of an increase in the speed of the motorcycle 10, the wind pressure which is therefore increased and is generated by way of the air stream on the deployed air-guiding element 16 exceeds the restoring force FR, and therefore the air-guiding portion 18 is moved into the retracted position II. The air-guiding element 16 can therefore be adapted in such a way that the air-guiding portion 18 is situated in the retracted position II at least from a defined first vehicle speed, for example selected from a range between 120 and 180 km/h, preferably between 120 and 160 km/h. As the retraction of the air-guiding portion 18 increases, aerodynamic flow influencing is reduced, with the result that flow influencing which is as low as possible is brought about in the retracted position II.

In contrast, the respective air-guiding portion 18 provides aerodynamic flow influencing at the lower vehicle speed.

If the speed of the motorcycle 10 is namely reduced, the retracted air-guiding portion 18 is pressed into the deployed position I again on account of the restoring force FR of the resilient supporting element 20. The air-guiding element 16 can thus be adapted in such a way that the air-guiding portion 18 is situated in the deployed position I at least up to a defined second vehicle speed, for example selected from a range between 30 and 120 km/h, preferably between 50 and 120 km/h. Depending on the arrangement of the air-guiding portion element 16 on the motorcycle 10, this can be used, for example, to protect the user of the motorcycle 10, inter alia, against the air stream air for whirled-up dirt and wet conditions.

An active actuation by way of the user is therefore not required in any of the cases.

As is shown by way of example in FIGS. 2 and 3, the connection of the root portion 17 to the vehicle body 12 is configured as unarticulated connection 17a. To this end, the root region 17 comprises a joint 17a which is fastened on one side to the air-guiding portion 18 and on the other side to the vehicle (here, to the vehicle body 12). The joint 17a is shown by way of example as an axial joint, such as a hinge, but, as an alternative, can also be configured as a ball joint or integral hinge.

On account of the articulated connection 17a, the air-guiding portion 18 can be of stiff or rigid configuration. As an alternative, it can be of elastically deformable configuration along its entire length between the root portion 17 and the free end 19, or merely in one or more portions.

In order to achieve the described method of operation, the root portion 17 is arranged in front of the air-guiding portion 18 in the vehicle longitudinal direction L.

As described, the embodiment which is shown makes it possible that, in the deployed position I, the respective air-guiding element 16 brings about a reduction of airflow impact on the vehicle user. To this end, the respective air-guiding element 16 is arranged in front of the user in the vehicle longitudinal direction L on the respective vehicle side of the motorcycle 10.

FIG. 1 shows three exemplary arrangements of the air-guiding elements 16. Accordingly, a first air-guiding element 16 is positioned in a region in front of the foot or the shin of the user. Moreover, it is provided in the region of a vehicle radiator 21. A further air-guiding element 16 is provided in a region in front of the knee or thigh, and a third air-guiding element 16 is provided in a region in front of the hip of the user, in order to protect the respective body part in the deployed position I completely or at least partially.

All three air-guiding elements 16 are arranged, in relation to the vehicle longitudinal direction L of the motorcycle 10, between the front wheel 13 and a leg portion 22 which is provided for the leg of the user.

It goes without saying that the air-guiding elements 16 can be provided in any desired number and combination of these arrangements (and/or other arrangements) on the motorcycle 10.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A motorcycle, comprising:
an adjustable air-guiding element, the air-guiding element having
  a root portion connected to one or both of a vehicle body and a vehicle structure of the motorcycle, and
  an air-guiding portion extending from the root portion to a free end of the air-guiding element,
wherein
  the air-guiding portion is
    movable relative to at least one of the vehicle body and/or the vehicle structure between a deployed position and an retracted position,
    supported by a resilient supporting element on one or both of the vehicle body and the vehicle structure, and
    a restoring force of the resilient supporting element is configured such that upon an increase in the speed of the motorcycle, wind pressure thus increased on the deployed air-guiding element exceeds the restoring force and the air-guiding portion is moved into the retracted position, and wherein the retracted air-guiding portion is pressed back into the deployed position by the restoring force of the resilient supporting element in the case of a reducing speed.

2. The motorcycle according to claim 1, wherein a connection of the root portion to one or both of the vehicle body and the vehicle structure is a rigid connection or an articulated connection.

3. The motorcycle according to claim 2, wherein the root portion is arranged in front of the air-guiding portion in a longitudinal direction of the motorcycle.

4. The motorcycle according to claim 3, wherein the resilient supporting element is connected to an inner side of the air-guiding portion facing a longitudinal centerline of the motorcycle.

5. The motorcycle according to claim 4, wherein the supporting element includes a spring element configured to provide a restoring force to move the air-guiding portion out of the retracted position toward the deployed position.

6. The motorcycle according to claim 1, wherein the air-guiding element is configured to reduce an air stream impact on a vehicle user when the air-guiding element is in the deployed position.

7. The motorcycle according to claim 1, wherein the air-guiding element is arranged in a longitudinal direction of the motorcycle between a front wheel of the motorcycle and a location of a leg of the vehicle user during driving of the motorcycle.

8. The motorcycle according to claim 1, wherein the air-guiding element is configured such that the air-guiding portion is in the retracted position at least from a first predefined vehicle speed.

9. The motorcycle according to claim 8, wherein the first predefined vehicle speed is between 120 and 180 km/h.

10. The motorcycle according to claim 9, wherein the first predefined vehicle speed is between 120 and 160 km/hr.

11. The motorcycle according to claim 8, wherein the air-guiding element is configured such that the air-guiding portion is in the deployed position at least up to a second predefined vehicle speed.

12. The motorcycle according to claim 11, wherein the second predefined vehicle speed is between 30 and 120 km/hr.

13. The motorcycle according to claim 12, wherein the second predefined vehicle speed is between 50 and 120 km/hr.

14. The motorcycle according to claim 1, wherein the air-guiding element is configured such that the air-guiding portion is in the deployed position at least up to a second predefined vehicle speed.

15. The motorcycle according to claim 14, wherein the second predefined vehicle speed is between 30 and 120 km/hr.

16. The motorcycle according to claim 14, wherein the second predefined vehicle speed is between 50 and 120 km/hr.

17. The motorcycle according to claim 3, wherein the resilient supporting element is configured such that the air-guiding portion remains in the deployed position up to a defined second vehicle speed and is moved into the retracted position only from a defined first vehicle speed which is higher than the second vehicle speed, and the first vehicle speed lies within a range between 120 km/h and 180 km/h, and the second vehicle speed lies within a range between 30 km/h and 120 km/h.

* * * * *